United States Patent [19]
Goss et al.

[11] Patent Number: 5,960,602
[45] Date of Patent: Oct. 5, 1999

[54] SHIELDED METALLIC REFLECTIVE INSULATION ASSEMBLY

[75] Inventors: Robert M. Goss, Glencoe; Edward J. Wolbert, Lisle, both of Ill.; Bruce J. Alpha, Valparaiso, Ind.; Bryan L. Risley, Streator, Ill.

[73] Assignee: Transco Products, Inc., Chicago, Ill.

[21] Appl. No.: 08/800,361

[22] Filed: Feb. 14, 1997

[51] Int. Cl.⁶ ............................... E04B 1/78; F16L 59/14
[52] U.S. Cl. .................... 52/404.4; 52/404.1; 52/726.1; 138/158
[58] Field of Search ................ 52/404.1, 404.4, 52/406.2, 720.1, 726.1, 732.1, 732.2, 738.1; 138/147, 149, 157, 158, 162, DIG. 4, DIG. 10

[56] References Cited

U.S. PATENT DOCUMENTS

| | | |
|---|---|---|
| 347,631 | 8/1886 | Merriam .................................... 138/149 |
| 2,613,166 | 10/1952 | Gronemeyer ............................ 138/147 |
| 2,841,203 | 7/1958 | Gronemeyer ......................... 138/148 X |
| 2,928,948 | 3/1960 | Silversher . |
| 3,061,491 | 10/1962 | Sherrard et al. . |
| 3,648,734 | 3/1972 | Waite et al. . |
| 3,715,265 | 2/1973 | Allen et al. .......................... 138/149 X |
| 3,785,407 | 1/1974 | Waite et al. . |
| 3,818,949 | 6/1974 | Johnson . |
| 3,879,910 | 4/1975 | Waite . |
| 3,895,143 | 7/1975 | Tarlow . |
| 3,981,689 | 9/1976 | Trelease .............................. 138/147 X |
| 4,100,711 | 7/1978 | Skuran . |
| 4,251,598 | 2/1981 | Waite . |
| 4,303,553 | 12/1981 | Aoki et al. . |
| 4,323,088 | 4/1982 | McClellan ........................... 138/157 X |
| 4,966,201 | 10/1990 | Svec et al. .......................... 138/149 X |
| 5,084,234 | 1/1992 | Hosgen . |
| 5,310,594 | 5/1994 | Holland et al. ..................... 52/738.1 X |
| 5,334,806 | 8/1994 | Avery . |
| 5,368,184 | 11/1994 | Fay et al. ............................. 138/149 X |
| 5,380,131 | 1/1995 | Crawford ........................... 52/738.1 X |
| 5,416,333 | 5/1995 | Greenspan . |

OTHER PUBLICATIONS

"Radiation Shielding Mats," JIS Z 4819–1995, published by Japanese Standards Association, 1995.
"Meeting the Challenge of Service to the Nuclear Power Industry," *Nuclear News*, Aug. 1995.
"Coated Lead Shielding Protects Nuclear Plant Workers," *Power Engineering*, vol. 100, No. 09, Sep. 1996.
"Weir," The Weir Group PLC., Nov. 1994.
ASTM C 667–92, Standard Specification for Prefabricated Reflective Insulation Systems for Equipment and Pipe Operating at Temperatures Above Ambient Air (Aug., 1992).
Onitsuku, Hironori, "Radiation Exposure Reduction Program at Mitsubishi Heavy Industries," 1–22 (REM Conference, U.S.A., 1992).

*Primary Examiner*—Carl D. Friedman
*Assistant Examiner*—Kevin D. Wilkens
*Attorney, Agent, or Firm*—Wallenstein & Wagner, Ltd.

[57] ABSTRACT

A shielded metallic reflective insulation ("SMRI") assembly (10) incorporates a plurality of distinct layers. In a first embodiment, these layers are an inner layer (30), a first supporting layer (40), an insulation layer (60), and an outer layer (70). A second embodiment further includes a second supporting or barrier layer (50) between the first supporting layer (40) and the insulation layer (60). In a third embodiment, the first inner supporting layer (40) can replace both the inner layer (30) and second supporting layer (50).

19 Claims, 2 Drawing Sheets

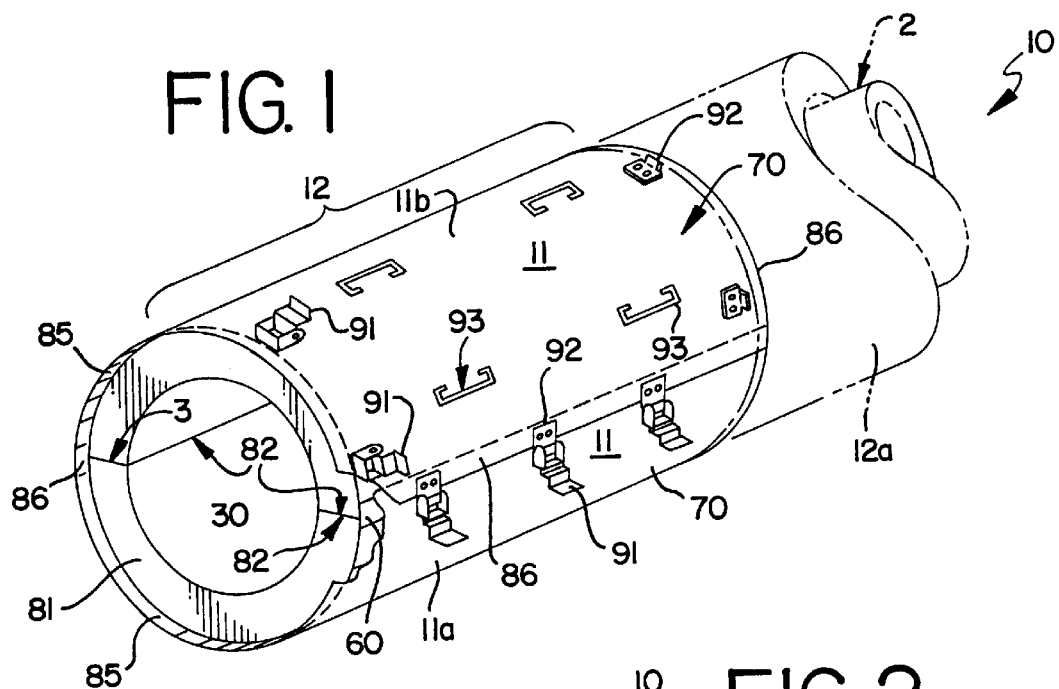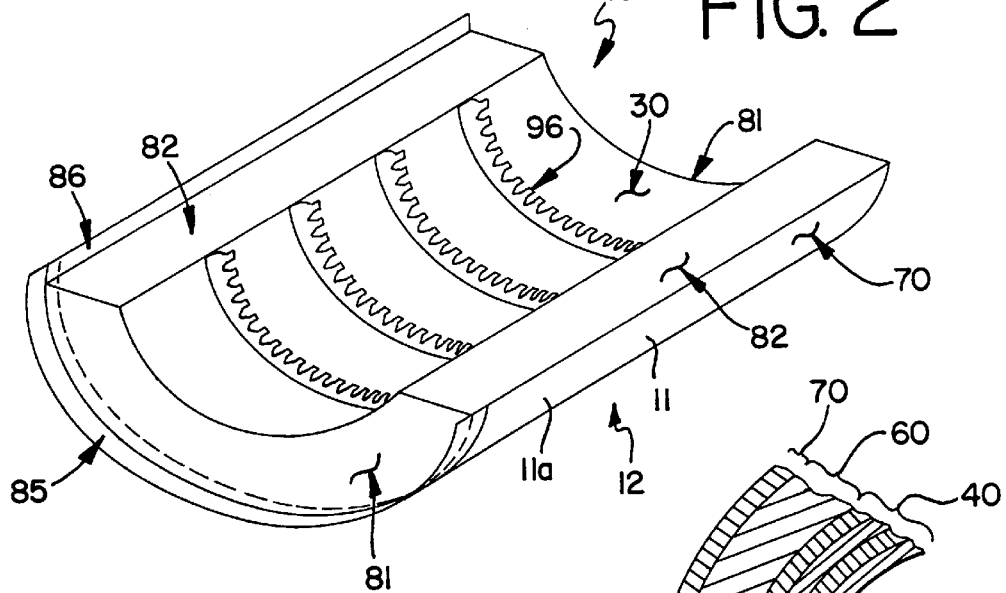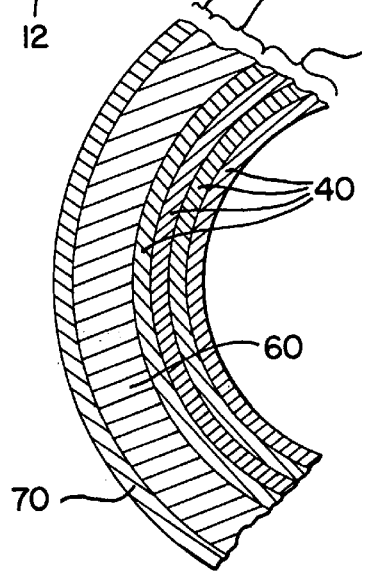

SHIELDED METALLIC REFLECTIVE INSULATION ASSEMBLY

TECHNICAL FIELD

The present invention relates generally to insulations for maintaining thermal efficiency, lower environmental temperatures and reduction of ionizing radiation exposure, and more particularly, to shielded metallic reflective insulation ("SMRI") assembly installed onto plant systems for nuclear reactors to thermally insulate plant systems as well as moderate and absorb neutrons, x-rays, gamma rays or other ionizing radiation sources from the system.

BACKGROUND OF THE INVENTION

Plant systems for nuclear reactor applications, such as reactor fuel vessels, reactor fuel coolant, conduits and related components contain liquids or stream at high temperature and high pressure. In addition, such systems can contain solid and liquid materials emitting neutrons, x-rays and gamma ray radiation.

Historically, separate products have been used to provide thermal insulation and radiation shielding. In addition, thermal insulations are permanently installed onto the systems while ionized radiation shielding commonly has been installed temporarily during plant outage and removed thereafter. Because only temporary shieldings have been in use, the current practice in the industry has been to undergo a chemical decontamination process before an outage. This process is performed to reduce the amount of ionized radiation emanating from a system in order to reduce radiation exposure to personnel working therein and thereinaround. This chemical decontamination process is an added operation and maintenance cost.

From a regulatory plant design and qualification process, all structures attached to a safety-related plant system on a permanent basis must satisfy a number of regulatory concerns, such as seismic (earthquake) qualification, fire loading and material interaction with stainless steel.

Also, most effective shielding designs are relatively heavy so that the design of any structures bearing this weight must be carefully evaluated.

SUMMARY OF THE INVENTION

In a continuous effort to improve upon these prior systems, the present invention was designed. It is believed to be both an improvement on many of these past systems and a solution to many of these and other problems.

The present invention relates to a shielded metallic reflective insulation ("SMRI") assembly and a method for reducing thermal and ionizing radiation emanating from a system, such as equipment (e.g., reactor vessels, boiler vessels, holding tanks, heat exchangers, separators, polishers and dryers), conduits (e.g., pipes, connections and nozzles), and other associated components (e.g., motors, generators, pumps and valves) which may include materials emanating radiation or are connected to a stream at lower temperature and/or pressure, such as a waste treatment area.

The present invention is based upon the principle that stainless steel provides both thermal and ionizing radiation insulation. Customarily other materials, such as lead, have been used in such systems. As a rule of thumb, the shielding effect of stainless steel at various thicknesses is proportionate to the shielding effect of lead. For example, a 3" thickness of stainless steel plating will have the same shielding effect as a 2" thickness of lead plating. The amount of such stainless steel is dependent upon thermal and ionizing radiation reduction design criteria and requirements and any space limitations.

According to a first aspect of the present invention, an insulation assembly for placement and encapsulating an object is disclosed. This assembly is in the form of abutting and connected adjacent segments. Each segment has two or more connected panel sections cooperating with one another. The segments and panel sections are sized to permit installation, removal and replacement thereof. Accordingly, a pipe may have multiple segments along its length with each such segment having two panel sections.

The composition of a first embodiment of the assembly includes an inner layer in close proximity to the object to be insulated. This inner layer is contoured to generally and closely follow an external surface of the object. Spacers can be attached thereto for proper fitting about the object. This first layer is composed of 16 to 28 gauge stainless steel. An outer layer is provided farthest from the object and composed of 16 to 28 gauge stainless steel. The inner and outer layers form the shell for the remaining internal components of the assembly.

Specifically, a first supporting layer having a thickness of about ¼" to 1" is positioned adjacent the inner layer. This first supporting layer includes a plurality of parallel, layered plates of stainless steel attached to one another; each plate is about ¼" to ⅜" thick. Finally, there is an insulation layer between the first supporting layer and the outer layer. This insulating layer is between about 2" and 5" thick and comprises a plurality of parallel, layered stainless steel foils. Each foil is between about 0.001" and 0.0025" thick. In the preferred construction, the inner layer is 20 gauge stainless steel; the outer layer is 20 gauge stainless steel; the first supporting layer is two layers of ⅜" Type 304 stainless steel plate having a thickness of ¾"; and, the thickness of each foil in the insulation layer is about 0.002", the thickness of the insulation layer having a cross-sectional density of about three foils per inch.

In a second embodiment of the present invention, there is a barrier layer disposed between the first supporting layer and the insulation layer. This barrier layer comprises 16 to 28 gauge stainless steel. In the preferred construction, the material for this barrier layer is 24 gauge stainless steel.

A third embodiment of the present invention includes a first supporting layer, as opposed to an inner layer in the first two embodiments, in close proximity to the object being insulated. This first supporting layer is contoured to generally and closely follow an external surface of the object and has a thickness of about 1½". This layer comprises approximately four layers of ⅜" Type 304 stainless steel plates attached together. Conventional and optional spacers attached to this first supporting layer ensure proper fitting of the assembly (panel sections and segments) on the object being insulated. An insulation layer is disposed adjacent this first supporting layer. Preferably, this insulation layer has a thickness of between about 2" and 5" and comprises a plurality of parallel, layered stainless steel foil. Each foil sheet has a thickness of between about 0.001" and 0.0025". Finally, an outer layer is positioned above the insulation layer. This outer layer is 16 to 28 gauge stainless steel. Consequently, this third embodiment generally comprises an insulation layer sandwiched between a first supporting layer and an outer layer.

In the preferred construction of this third embodiment, the outer layer is 20 gauge stainless steel; and, the insulation layer has a thickness of about 3"; the thickness of each foil sheet is about 0.002" with a cross-sectional density of about three foil sheets per inch.

A barrier layer may be optionally disposed between the first supporting layer and the insulation layer. This barrier layer preferably is 16 to 28 gauge stainless steel, and more particularly, 24 gauge stainless steel.

Other advantages and aspects of the present invention will become apparent upon reading the following description of the drawings and detailed description of the invention.

BRIEF DESCRIPTION OF THE DRAWINGS

In order that the present invention may be more fully understood, it will now be described by way of example, with reference to the accompanying drawings in which:

FIG. 1 is a perspective view of a shielded metallic reflective insulation assembly made in accordance with the present invention;

FIG. 2 is a perspective internal view of a lower panel section of the assembly;

DETAILED DESCRIPTION OF THE PREFERRED EMBODIMENT

Figure 4:
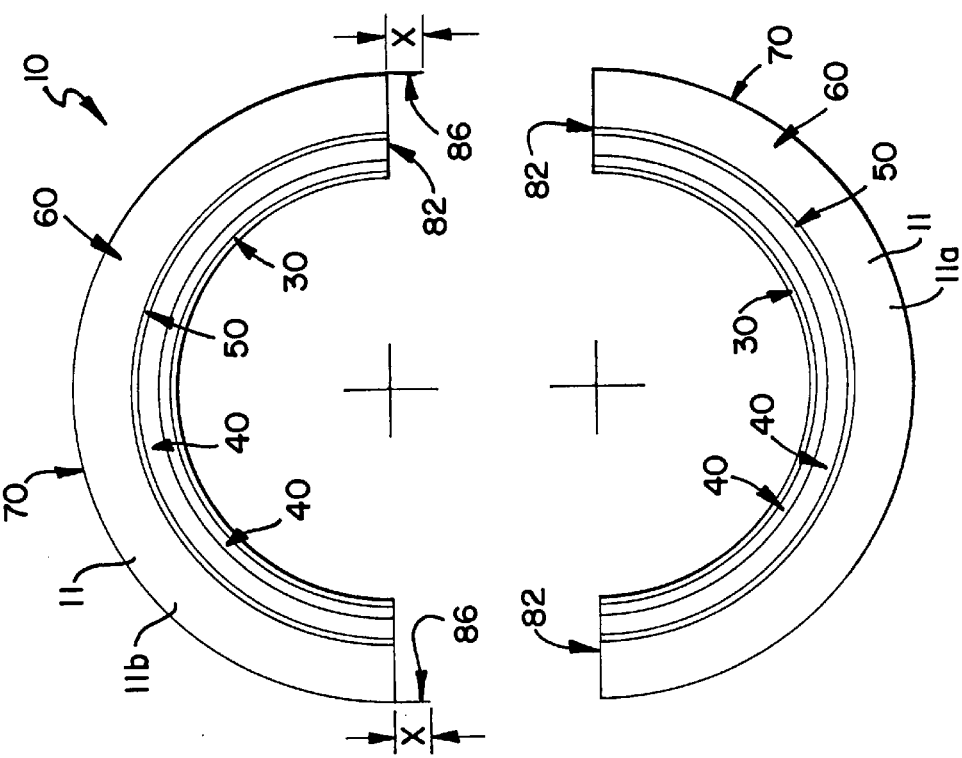
FIG. 4 is a schematic cross-sectional view of a lower panel section and an upper panel section for the second embodiment; and, FIG. 5 is a partial cross-sectional view of a panel section for the third embodiment.

While this invention is susceptible of embodiment in many different forms, there is shown in the drawings and will herein be described in detail, some preferred embodiments of the invention with the understanding that the present disclosure is to be considered as an exemplification of the principles of the invention and is not intended to limit the broad aspect of the invention to the embodiments illustrated. Accordingly, the assembly is described as it is constructed about a pipe section. The principles, both construction and method, are equally applicable to equipment (e.g., reactor vessels, boiler vessels, holding tanks, heat exchangers, separators, polishers and dryers), other types of conduits (e.g., pipes, connections and nozzles), and other associated components (e.g., motors, generators, pumps and valves).

The disclosure of U.S. Pat. No. 5,814,824, issued Sep. 29, 1998 and titled "Composite Thermal Insulation and Radioactive Radiation Shielding" is instructive to the present application and is incorporated herein by reference.

Referring to the drawings, FIG. 1 shows the assembly, generally designated by the reference number 10, insulating a portion of piping 2 (in phantom lines). The assembly 10 is preferably installed in segments 12 of removable panels 11. In the figures, a first [lower] panel 11a connects to and mates with a second [upper] panel 11b to surround (or encase) the pipe 2. Adjacent segments (shown generally as 12a in FIG. 1), with their panel sections (not shown), connect along the length of pipe 2 (or equipment) to the segment 12 and panels shown 11,11a,11b to completely encapsulate the pipe.

The shielded metallic reflective insulation (termed "SMRI") assembly 10 of the present invention incorporates four (4) [a first embodiment], five (5) [a second embodiment], or three (3) [a third embodiment] distinct layers. These layers are shown: for the first embodiment, in FIG. 3; for the second embodiment, in FIG. 4; and, for the third embodiment, in FIG. 5. The layers are 1) an inner layer 30; 2) a first supporting layer 40; 3) a second supporting layer 50; 4) an insulation layer 60; and, 5) an outer layer 70. A second embodiment omits the second supporting layer 50 or barrier layer. A third embodiment omits the inner layer (30).

The Inner Layer 30

The inner layer 30, often called the inner skin or plate, is composed of a material suitable for providing structural support to the assembly 10, such as, for example, stainless steel. This inner layer 30 is in closest proximity to the pipe. The preferred material is stainless steel (or "sst.") in the form of 16 to 28 gauge ("Ga.") stainless steel. This inner skin 30 is contoured to generally follow the external surface of the item or object, here a pipe 2, being insulated.

The First Supporting Layer 40

The first supporting layer 40 provides structural support to maintain the functional integrity of the assembly 10. Preferably, this layer 40 comprises a plurality of parallel, layered plates of steel, ideally stainless steel. The plates are attached together. These layered plates are depicted in both FIG. 3 and FIG. 4 as two separate layers with both such layers being identified as layer 40. The layered plates for the third embodiment are depicted in FIG. 5 as four separate layers, each being identified as layer 40. The individual plates are about ¼" to ⅜" in thickness and the entire layer comprised of all the attached plates is about ¼" to 1" in thickness. Space limitations and thermal and ionizing radiation reduction requirements dictate the thickness both of the plates and the entire layer.

The Second Supporting Layer 50 (optional)

Figure 3:
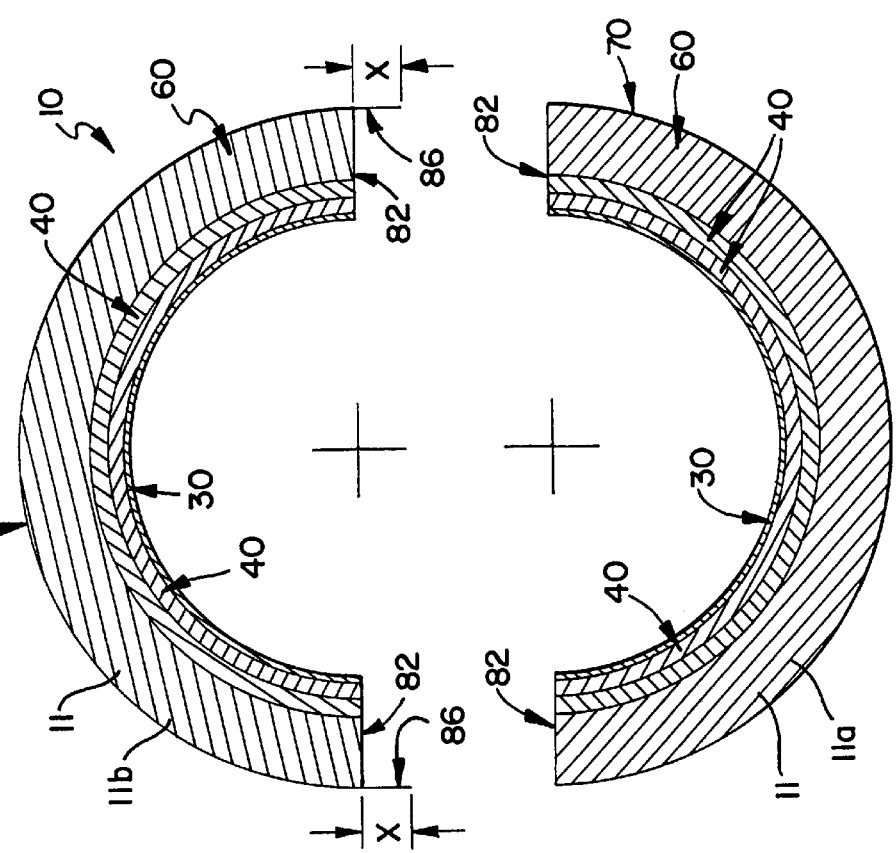
FIG. 3 is a schematic cross-sectional view of a lower panel section and an upper panel section for the first embodiment of the present invention.

In a first embodiment, shown in FIG. 3, this layer is not used. It is used in a second embodiment and shown in FIG. 4. The second supporting layer 50, or barrier layer, is constructed much like the inner layer 30. This layer is composed of stainless steel; the preferred material is 16 to 28 gauge stainless steel.

In the first embodiment (FIG. 3), this barrier layer 50 is omitted by securing the first supporting layer 40 in a spaced relation to the insulation layer 60. This can be accomplished by mechanically attaching, such as by welding, the ends of the first supporting layer 40 to the encasing material (outer layer 70 or longitudinal members 82).

The Insulation Layer 60

The insulation layer 60 comprises a plurality of parallel, layered stainless steel foil. The individual sheets of foils are between about 0.001 and about 0.0025" in thickness and the entire insulation layer comprised of all the sheets of foil is between about 2" to 5". In the preferred construction, the thickness of each sheet of foil is about 0.002" with the entire insulation layer having a cross-sectional density of about three (3) sheets of foil per inch thickness.

The Outer Layer 70

The outer layer 70, often called the outer skin or plate, is very much like the inner layer 30. It is, of course, larger (greater surface area) than the inner skin 30. This outer layer 70 is in farthest proximity to the pipe. This outer layer 70 is composed of a stainless steel with the preferred construction being 16 to 28 gauge stainless steel. This layer 70 is also contoured to generally follow the external surface of the item (and inner skin 30), here a pipe 2, being insulated.

The Third Embodiment

Shown generally in FIG. 5, in a third embodiment, the first inner supporting layer 40 can replace both the inner layer 30 and second supporting or barrier layer 50. The resultant first inner supporting layer 40 is, thus, twice as thick as those in the prior embodiments. This layer 40 in the third embodiment also comprises a plurality of parallel, layered plates of steel, ideally stainless steel. The plates are attached together. The individual plates are also about ¼" to ⅜" in thickness. Consequently, rather than the thickness of the entire layer of all the attached plates being about ¼" to 1" as in the first two embodiments, the thickness in this third embodiment is about ½" to 2". Again, space limitations and thermal and ionizing radiation reduction requirements dictate the thickness both of the plates and the entire layer.

Preferred Construction of The Layers in The First Embodiment

The inner layer 30—20 gauge stainless steel.

The first supporting layer 40—Approximately two (2) layers of ⅜" Type 304 stainless steel plate attached together for an entire thickness of ¾".

The insulation layer 60—Stainless steel foil of about 0.002" thickness with a cross-sectional total thickness of 3", the cross-sectional density of about three (3) sheets of foil per inch thickness.

The outer layer 70—20 gauge stainless steel.

Preferred Construction of The Layers in The Second Embodiment

Same as the first embodiment, but also includes the following between the first supporting layer 40 and the insulation layer 60:

The second supporting layer 50—24 gauge stainless steel.

Preferred Construction of The Layers in The Third Embodiment

The first supporting layer 40—Approximately four (4) layers of ⅜" Type 304 stainless steel plate attached together for an entire thickness of 1½".

The insulation layer 60—Stainless steel foil of about 0.002" thickness with a cross-sectional total thickness of 3", the cross-sectional density of about three (3) sheets of foil per inch thickness.

The outer layer 70—20 gauge stainless steel.

Construction of Assembly

Radial members 81 and longitudinal members 82 comprised of stainless steel provide end support to each panel 11. The radial members 81 and longitudinal members 82 are connected or integral with the inner and outer skins 30,70. These members 81,82 are preferably constructed of the same material as the skins 30,70, that is, 16 to 28 gauge stainless steel.

As shown in FIGS. 3 and 4, one panel 11 of the segment, here the upper panel 11b, further includes longitudinal laps 86 to cover the seams 3 (FIG. 1) of the panels 11 when they are mated (FIG. 1) to form a segment 12. Both panels 11a, 11b include a radial lap 85 to cover the seams between segments 12. Both the radial lap 85 and longitudinal laps 86 are formed of extensions of the outer skin or layer 70. Thus, these laps 85,86 are comprised of the same material as the outer layer 70, that being 16 to 28 gauge stainless steel. The longitudinal laps 86 extend the distance X, that being about ⅞41 beyond the longitudinal members 82.

To install the segment 12 shown, the panel without the longitudinal laps 86 is placed around the pipe 2. Here it is the lower panel 11a. The upper panel 11b is placed over/around the exposed pipe 2 such that the two panels abut one another. The longitudinal members 82 of each panel 11a, 11b are aligned against one another with the longitudinal laps 86 of the upper panel 11b extending over the lower panel 11a.

As again shown in FIG. 1, fasteners, such as buckles 91,92 are provided to secure the panels 11 and segments 12 together. In addition, handles 93 are provided to facilitate the installation, removal and replacement of the panels and the segments.

Conventionally and well known techniques of fastening, such as spot-welding, seam welding, screws, rivets and the like, are used at the butt-joints and adjoining ends of the layers to structurally support the component layers of the assembly together and in proper spacing and relationship to one another. For example, the inner layer 30 and outer layer 70 can be spot-welded to the longitudinal members 82.

As mentioned above, the total thickness and length of the assembly 10 are limited by the space available around the system, weight limitations on the system and thermal and radiation design criteria of the assembly.

While the assembly 10 has been shown to comprise panels 11 of virtually identical composition, it is understood that each panel can, if desired and system requirements permit, have different compositions. Moreover, the general shapes of the assembly segments conform generally to the objects being insulated. Accordingly, the panels' shapes may include other shapes beside cylindrical.

Turning to a general construction, each segment 12 on pipes 2 has a typical length of approximately 12 inches. Diameters of the individual segments vary with the diameter of the conduits and the components. Spacers 96 (FIG. 2) are provided as needed for correct installation. For such a size, three lateral buckles of the stainless steel locking long-reach type and three corresponding strikers are provided per segment. The strikers are attached to the longitudinal lap. Three circumferential buckles of the stainless steel locking long-reach type and three corresponding strikers are provided per inch panel section. The circumferential buckles are attached to the circumferential lap.

The laps are spot-welded to the outer layer. The outer layer is also rivetted to the longitudinal members 82. And, the inner layer is spot-welded to the longitudinal members 82.

The total thickness of the SMRI assembly for small bore piping is about 4". Once the panels and segments are placed into position on the pipe, they are attached to one another by engaging and locking the buckle/striker assemblies. The buckle/striker assemblies typically have a locking tab for preventing accidental opening. Once installed, there should be no gaps between the panels and segments.

The assembly is believed to be able to withstand seismic levels of at least up to about 7 gravity units ("G") for both OBE and SSE.

While the assembly is calculated to provide a true radiation attenuation half-value for the Cobalt 60 isotope, the actual in-plant effectiveness decreases ionizing radiation by a factor of from about one up to about ten times the theoretical calculated effectiveness for Cobalt-60 isotope. This ionizing radiation reduction benefit is about two to about five times better than typical temporary lead blankets. In addition, the SMRI assembly is believed to provide slightly better thermal insulation than the commercially available metallic thermal reflective insulation blocks.

This assembly complies with the United Nuclear Regulatory Commission Regulation 10 C.F.R. § 50.59 ("C.F.R. provision") and Reg. Guide 1.36 ("Reg. Guide provision) for nuclear safety-related plant systems, and therefore can be installed as a permanent plant structure. The C.F.R. provision requires a modification made in a nuclear reactor plant system to not affect the function or design of the system and to satisfy safety analysis. Satisfying the safety analysis involves determining that the risk of occurrence of accidents such as lost coolant, main steam line break, rod ejection and loss of off-site power is not increased as a result of the modification. Seismic qualification and load limitations of the system have to be met in order to satisfy the C.F.R.

provision. The Reg. Guide provision requires that a thermal insulation installed onto a reactor grade stainless steel piping contain materials compatible with the reactor grade stainless steel.

While the invention has been described with reference to some preferred embodiments of the invention, it will be understood by those skilled in the art that various modifications may be made and equivalents may be substituted for elements thereof without departing from the broader aspects of the invention. The present examples and embodiments, therefore, are illustrative and should not be limited to such details.

We claim:

1. An insulation assembly for placement around and encapsulating an object to be insulated comprising:

an inner layer;

an outer layer in farthest proximity to the inner layer;

a first supporting layer between the inner and outer layers comprising a plurality of parallel, layered plates of stainless steel abutting one another, each of the plates being about ¼" to ⅜" thick;

an insulation layer between the first supporting layer and the outer layer; and a barrier layer disposed between the first supporting layer and the insulation layer.

2. The insulation assembly as defined in claim 1 wherein the inner layer is composed of 16 to 28 gauge stainless steel.

3. The insulation assembly as defined in claim 1 wherein the inner layer is contoured to generally and closely follow an external surface of an object to be insulated.

4. The insulation assembly as defined in claim 1 wherein the first supporting layer has a total thickness of about greater than ¼" to about 1" in thickness.

5. The insulation assembly as defined in claim 1 wherein the outer layer is composed of 16 to 28 gauge stainless steel.

6. The insulation assembly as defined in claim 1 wherein the barrier layer is composed of 16 to 28 gauge stainless steel.

7. The insulation assembly as defined in claim 1 wherein the insulation layer comprises a plurality of parallel, layered stainless steel foil, each foil having a thickness of between about 0.001" and 0.0025".

8. The insulation assembly as defined in claim 7 wherein the entire insulation layer of all the foils is between about 2" to 5" thick.

9. The insulation assembly as defined in claim 8 wherein the thickness of each foil is about 0.002" with the entire insulation layer having a cross-sectional density of about three foils per inch.

10. The insulation assembly as defined in claim 1 wherein the assembly is composed of a plurality of adjacent, abutting separate segments.

11. The insulation assembly as defined in claim 10 wherein each segment has at least two mating panels releasably connected to and releasably removable from one another.

12. The insulation assembly as defined in claim 11 wherein the panels are conformed to generally follow the contours of an object to be insulated.

13. An insulation assembly for placement around and encapsulating an object to be insulated comprising:

an inner layer contoured to generally and closely follow an external surface of an object to be insulated, and composed of 16 to 28 gauge stainless steel;

an outer layer in farthest proximity to the inner layer and composed of 16 to 28 gauge stainless steel;

a first supporting layer having a thickness of about greater than ¼" to 1" positioned adjacent the inner layer and including a plurality of parallel, layered plates of stainless steel attached to one another, each plate being about ¼" to ⅜" thick;

an insulation layer between the first supporting layer and the outer layer, having a thickness of between about 2" and 5", and comprising a plurality of parallel, layered stainless steel foil, each foil having a thickness of between about 0.001" and 0.0025"; and a barrier layer disposed between the first supporting layer and the insulation layer, the barrier layer being composed of 16 to 28 gauge stainless steel.

14. The insulation assembly as defined in claim 13 wherein the assembly is composed of a plurality of adjacent, abutting seperate segments with each segment composed of at least two mating panel sections.

15. The insulation assembly as defined in claim 13 wherein:

the inner layer is 20 gauge stainless steel;

the outer layer is 20 gauge stainless steel;

the first supporting layer is two layers of ⅜" Type 304 stainless steel plate having a thickness of ¾"; and, the thickness of each foil in the insulation layer is about 0.002", the thickness of the insulation layer having a cross-sectional density of about three foils per inch.

16. The insulation assembly as defined in claim 15 wherein the barrier layer is 24 gauge stainless steel.

17. An insulation assembly for placement around and encapsulating an object to be insulated comprising:

a first supporting layer contoured to generally and closely follow an external surface of an object to be insulated, having a thickness of about 1½", and composed of approximately four layers of ⅜" Type 304 stainless steel plating attached together;

an outer layer composed of 20 gauge stainless steel;

an insulation layer between the first supporting layer and the outer layer, having a thickness of about 3", and comprising a plurality of parallel, layered stainless steel foil, each foil having a thickness of about 0.002" with a cross-sectional density of about three foils per inch; and a barrier layer disposed between the first supporting layer and the insulation layer and composed of 16 to 28 gauge stainless steel.

18. The insulation assembly as defined in claim 17 wherein the barrier layer is 24 gauge stainless steel.

19. The insulation assembly as defined in claim 18 wherein the assembly is composed of a plurality of adjacent, abutting separate segments with each segment composed of at least two mating panel sections.

* * * * *